United States Patent
Kida et al.

(10) Patent No.: US 11,507,212 B2
(45) Date of Patent: Nov. 22, 2022

(54) DISPLAY DEVICE WITH TOUCH PANEL

(71) Applicant: Sharp Display Technology Corporation, Kameyama (JP)

(72) Inventors: Kazutoshi Kida, Kameyama (JP); Yasuhiro Sugita, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 17/712,433

(22) Filed: Apr. 4, 2022

(65) Prior Publication Data
US 2022/0326797 A1    Oct. 13, 2022

(30) Foreign Application Priority Data

Apr. 8, 2021    (JP) .............................. JP2021-066143

(51) Int. Cl.
  *G06F 3/041* (2006.01)
  *G06F 3/044* (2006.01)
  *G02F 1/1362* (2006.01)
  *G02F 1/1368* (2006.01)

(52) U.S. Cl.
  CPC .......... *G06F 3/0412* (2013.01); *G02F 1/1368* (2013.01); *G02F 1/136286* (2013.01); *G06F 3/044* (2013.01)

(58) Field of Classification Search
  CPC .. G06F 3/0412; G06F 3/044; G02F 1/136286; G02F 1/1368
  See application file for complete search history.

(56) References Cited

U.S. PATENT DOCUMENTS

| | | | |
|---|---|---|---|
| 2004/0008171 A1* | 1/2004 | Kimura | G09G 3/3648 345/87 |
| 2011/0193852 A1* | 8/2011 | Lee | G02F 1/133555 345/92 |
| 2012/0056835 A1 | 3/2012 | Choo et al. | |
| 2012/0242634 A1* | 9/2012 | Maruyama | G09G 3/3648 345/212 |
| 2016/0202835 A1* | 7/2016 | Mizuhashi | G02F 1/13306 345/174 |
| 2017/0200407 A1* | 7/2017 | Nakao | G09G 3/2092 |
| 2017/0221435 A1* | 8/2017 | Shima | G09G 3/20 |
| 2019/0279587 A1 | 9/2019 | Nakao et al. | |

FOREIGN PATENT DOCUMENTS

| JP | 2012-059265 A | 3/2012 |
|---|---|---|
| JP | 2017-083768 A | 5/2017 |

OTHER PUBLICATIONS

Cheolse Kim et al., "Advanced In-cell Touch Technology for Large Sized Liquid Crystal Displays", SID 2015 Digest, LG Display Co., Ltd., 1007, Deogeun-ri, Wollong-myeon, Paju-si, Gyeonggi-do, Korea, Jul. 29, 2015, p. 895-898.

* cited by examiner

*Primary Examiner* — Hong Zhou
(74) *Attorney, Agent, or Firm* — ScienBiziP, P.C.

(57) ABSTRACT

A display device includes a switching element that switches, based on data held by a memory circuit, between a state in which a pixel electrode and a first wiring line are connected to each other and a state in which the pixel electrode and a second wiring line are connected to each other, a power source circuit for white color that supplies a first signal having the opposite phase to a phase of a drive signal, to the first wiring line provided at a pixel in which a Tx electrode is disposed, and a power source circuit for black color that supplies, to the second wiring line, a second signal having the same phase as the phase of the drive signal.

7 Claims, 10 Drawing Sheets

DISPLAY DEVICE WITH TOUCH PANEL

CROSS-REFERENCE TO RELATED APPLICATIONS

This application claims the benefit of priority to Japanese Patent Application Number 2021-066143 filed on Apr. 8, 2021. The entire contents of the above-identified application are hereby incorporated by reference.

BACKGROUND

Technical Field

The disclosure relates to a display device with a touch panel.

In known art, a display device with a touch panel is known that is provided with an in-cell touch panel. Such a display device with a touch panel is disclosed in JP 2012-59265 A and in Cheolse Kim, Deuk Su Lee, Ju Han Kim, Hun Bae Kim, Seung Rok Shin, Ji Hyun Jung, In Hyuk Song, Chul Sang Jang, Keuk Sang Kwon, Sung Ho Kim, Geon Tae Kim, Jeong Hwan Yoon, Bu-Yeol Lee, Byeong Koo Kim, and In-Byeong Kang, "Advanced In-cell Touch Technology for Large Sized Liquid Crystal Displays", SID 2015 DIGEST, 2015, p. p. 895-898, for example.

A display device with a touch panel disclosed in JP 2012-59265 A includes a sensing electrode built in a pixel array. A drive voltage is supplied to the sensing electrode. When the drive voltage is supplied, if an object touches the front surface of the touch panel, an electrostatic capacitance is formed between the object and the sensing electrode, and a charge is guided to the sensing electrode. Then, the display device with the touch panel detects the touch by the object based on a signal (a self-capacitance signal) corresponding to the charge guided to the sensing electrode.

Further, a display device with a touch panel, which is disclosed in Cheolse Kim, Deuk Su Lee, Ju Han Kim, Hun Bae Kim, Seung Rok Shin, Ji Hyun Jung, In Hyuk Song, Chul Sang Jang, Keuk Sang Kwon, Sung Ho Kim, Geon Tae Kim, Jeong Hwan Yoon, Bu-Yeol Lee, Byeong Koo Kim, and In-Byeong Kang, "Advanced In-cell Touch Technology for Large Sized Liquid Crystal Displays", SID 2015 DIGEST, 2015, p. p. 895-898, is provided with a pixel electrode, a thin film transistor connected to the pixel electrode, and a plurality of touch panel electrodes. Then, when supplying a drive signal to the touch panel electrode, the display device with the touch panel turns off the thin film transistor. As a result, the pixel electrode is brought into a floating state, and the pixel electrode can be electrostatically coupled with a common electrode. Thus, a voltage of a liquid crystal layer does not change. As a result, touch detection does not affect the display.

Further, in the known art, a display device is known in which a memory is provided at each of a plurality of pixels. Such a display device is disclosed, for example, in JP 2017-83768 A.

A display device disclosed in JP 2017-83768 A includes a plurality of pixels, a storage control circuit, and a display control circuit. Each of the plurality of pixels is provided with a memory that stores digital signals corresponding to image data, and a display element that is driven based on output data of the memory. The storage control circuit causes the memory to store data from a signal line corresponding to the memory. The display control circuit supplies, to the display element, a display signal or a non-display signal based on the data stored in the memory. As a result, display based on the data stored in the memories are performed in the plurality of pixels.

SUMMARY

In the so-called memory-in-pixel display device disclosed in JP 2017-83768 A, in which the memory is provided at each of the plurality of pixels, a High potential voltage or a Low potential voltage is constantly applied to a pixel electrode by the memory. When attempting to incorporate an in-cell touch panel into such a memory-in-pixel display device, even when the thin film transistor is turned off, as disclosed in Cheolse Kim, Deuk Su Lee, Ju Han Kim, Hun Bae Kim, Seung Rok Shin, Ji Hyun Jung, In Hyuk Song, Chul Sang Jang, Keuk Sang Kwon, Sung Ho Kim, Geon Tae Kim, Jeong Hwan Yoon, Bu-Yeol Lee, Byeong Koo Kim, and In-Byeong Kang, "Advanced In-cell Touch Technology for Large Sized Liquid Crystal Displays", SID 2015 DIGEST, 2015, p. p. 895-898, it is not possible to bring the pixel electrode into a floating state. Further, because the memory, and the like are disposed in the pixel, it is difficult to provide, inside the pixel, an additional thin film transistor for bringing the pixel electrode into the floating state. Even if the pixel is made larger and the additional thin film transistor is provided inside the pixel, a drive signal needs to be supplied in addition to the above-described High voltage. In this way, when the drive signal is superimposed on the High voltage, there is a problem in that the voltage may exceed a withstand voltage of the additional thin film transistor. Therefore, a display device with a touch panel provided with a memory-in-pixel and in-cell touch panel is not realized.

The disclosure has been conceived in order to solve the problem described above, and an object of the disclosure is to provide a display device with a touch panel provided with a memory-in-pixel and in-cell touch panel.

In order to solve the problem described above, a display device with a touch panel according to an aspect of the disclosure includes a touch panel substrate including a plurality of pixels partitioned by a plurality of source lines and a plurality of gate lines, a plurality of pixel electrodes respectively provided at the plurality of pixels, a thin film transistor provided at each of the plurality of pixels and connected to one of the plurality of source lines and one of the plurality of gate lines, a memory circuit provided at each of the plurality of pixels and connected to the thin film transistor, a plurality of touch sensor electrodes disposed facing the plurality of pixel electrodes, a drive circuit configured to apply a voltage to the plurality of touch sensor electrodes, a first wiring line configured to supply, to each of the plurality of pixels, a voltage having an opposite phase to a phase of the voltage applied to the plurality of touch sensor electrodes, a second wiring line configured to supply, to each of the plurality of pixels, a voltage having the same phase as the phase of the voltage applied to the plurality of touch sensor electrodes, and a switching element configured to switch, based on data held by the memory circuit, between a state in which the pixel electrode and the first wiring line are connected to each other, and a state in which the pixel electrode and the second wiring line are connected to each other. The plurality of touch sensor electrodes include a plurality of transmitter electrodes to which a drive signal for touch detection is supplied from the drive circuit, and a plurality of receiver electrodes configured to supply, to the drive circuit, a mutual capacitance signal generated as a result of the drive signal being supplied to the plurality of transmitter electrodes. In the display device with the touch panel, a first power source circuit is further provided that is configured to supply a first signal having an opposite phase to a phase of the drive signal to the first wiring line provided at the pixel in which the pixel electrode is disposed facing one of the plurality of transmitter electrodes, and to supply a second signal having the same phase as the phase of the drive signal to the second wiring line provided at the pixel in which the pixel electrode is disposed facing one of the plurality of transmitter electrodes.

According to the configuration described above, the display device with the touch panel provided with the memory-in-pixel and in-cell touch panel can be provided without providing the additional thin film transistor for bringing the pixel electrode into the floating state.

BRIEF DESCRIPTION OF DRAWINGS

The disclosure will be described with reference to the accompanying drawings, wherein like numbers reference like elements.

DESCRIPTION OF EMBODIMENTS

Hereinafter, embodiments of the disclosure will be described in detail with reference to the drawings. In the drawings, the same or corresponding portions are denoted by the same reference signs, and the description thereof will not be repeated. Note that, for ease of description, in the drawings referred to below, configurations may be simplified or schematically illustrated, and some components may be omitted. Further, dimensional ratios between components illustrated in the drawings are not necessarily indicative of actual dimensional ratios.

First Embodiment

Figure 1:
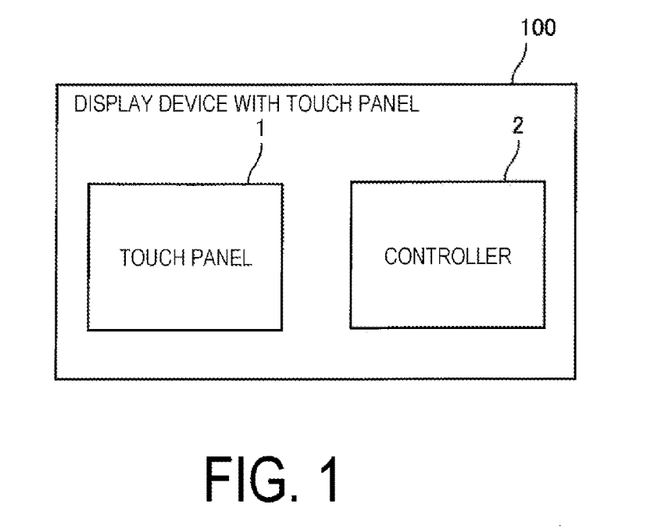
FIG. 1 is a block diagram illustrating a configuration of a display device according to a first embodiment.
Figure 2A:
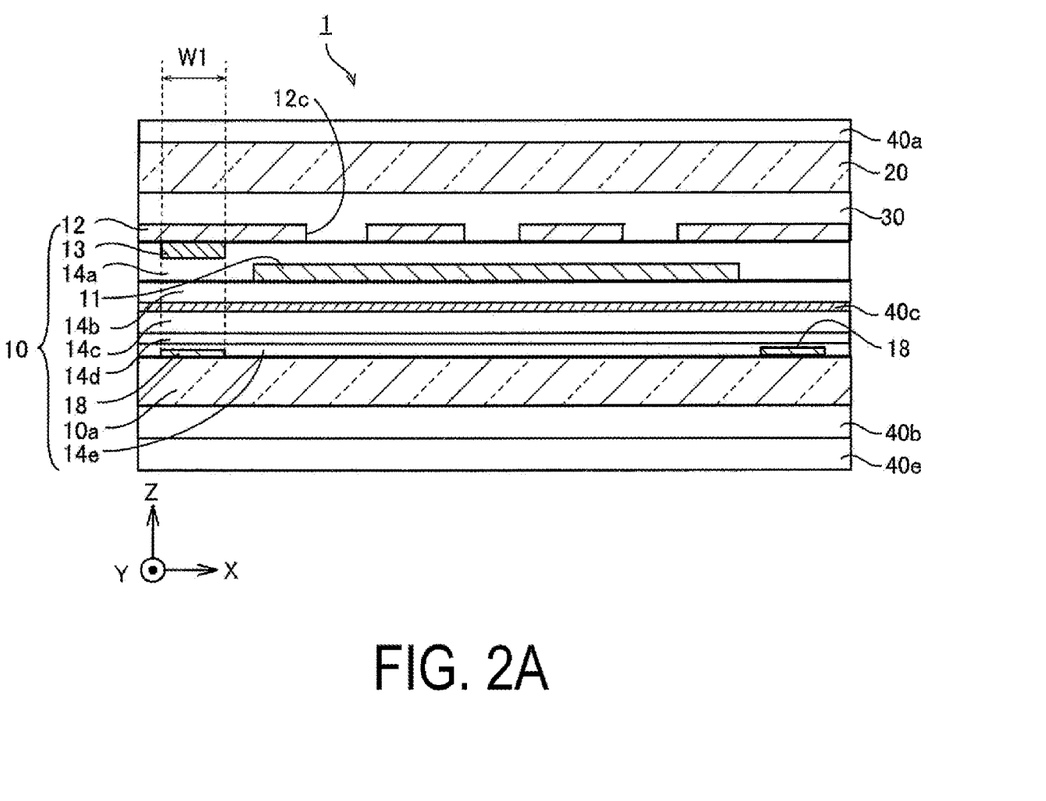
FIG. 2A is a cross-sectional view of a touch panel taken along a direction in which a gate line extends.
Figure 2B:
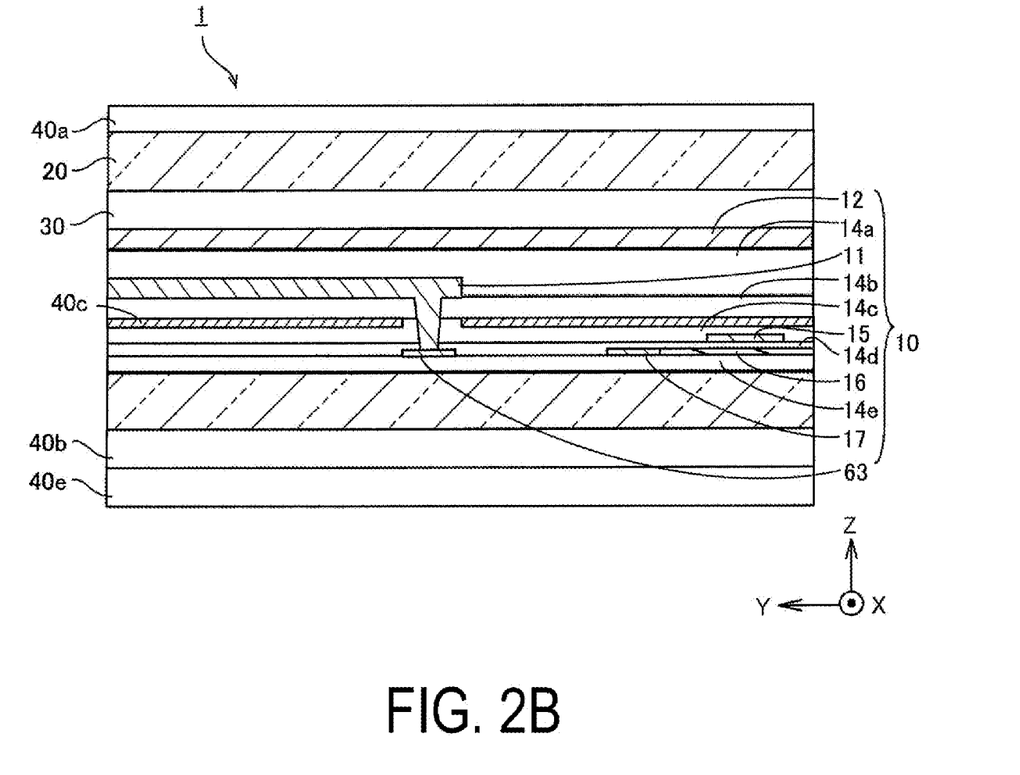
FIG. 2B is a cross-sectional view of the touch panel taken along a direction in which a source line extends.
Figure 3:
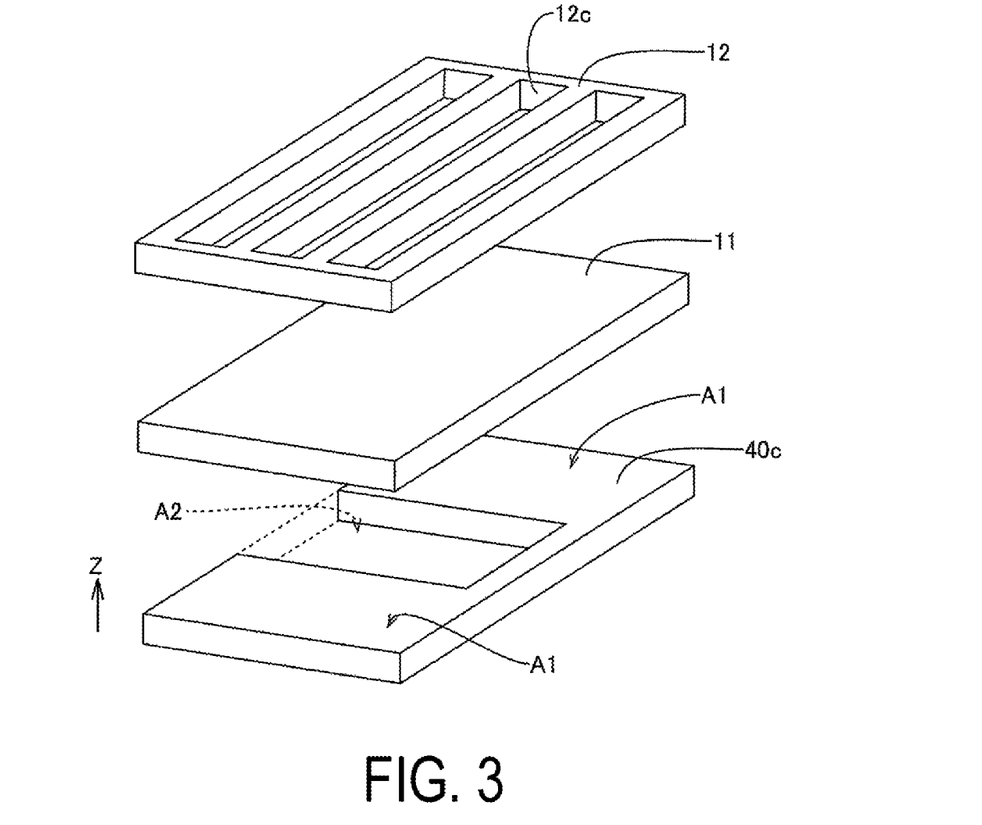
FIG. 3 is a schematic perspective view illustrating a configuration of a touch sensor electrode, a pixel electrode, and a reflector.

In FIG. 1, a configuration of a display device with a touch panel 100 (hereinafter referred to as a "display device 100") according to a first embodiment is described. FIG. 1 is a block diagram illustrating a functional configuration of the display device 100 according to the first embodiment. Further, FIG. 2A is a cross-sectional view taken along a direction in which a gate line 15 extends (X direction), and FIG. 2B is a cross-sectional view taken along a direction in which a touch signal line 13 extends (Y direction). FIG. 3 is a schematic perspective view illustrating a configuration of a touch sensor electrode 12, a pixel electrode 11, and a reflector 40c.

As illustrated in FIG. 1, the display device 100 is provided with a touch panel 1 and a controller 2. The touch panel 1 is, for example, a full-in-cell touch panel. The touch panel 1 also functions as a display panel for displaying a video or an image. The controller 2 executes each control processing in the display device 100 based on a touch position acquired from the touch panel 1. Further, the touch panel 1 is constituted as a so-called memory-in-pixel (MIP) display in which a memory circuit 62 (see FIG. 5) is disposed in each of a plurality of pixels 60 (see FIG. 5). Further, as illustrated in FIG. 2A and FIG. 2B, the touch panel 1 is provided with the reflector 40c, and is constituted as a so-called reflective display. Further, a backlight 40e is provided at the touch panel 1. Therefore, the touch panel 1 according to the first embodiment is a hybrid touch panel combining a reflective touch panel and a transmissive touch panel, and displays an image or a video using light reflected by the reflector 40c and light (transmitted light) from the backlight 40e. Note that the touch panel according to the disclosure is not limited to the reflective display and the hybrid display combining the reflective display and the transmissive display. In other words, in the disclosure, one of the reflectors 40c and the backlight 40e need not necessarily be provided at the touch panel 1.

As illustrated in FIG. 2A, the touch panel 1 includes an active matrix substrate 10, a counter substrate 20, and a liquid crystal layer 30 sandwiched between the active matrix substrate 10 and the counter substrate 20. Further, a pair of polarizers 40a and 40b are provided so as to sandwich the active matrix substrate 10 and the counter substrate 20 therebetween. A color filter (not illustrated) is disposed at the counter substrate 20. Although not illustrated, a protective glass or the like is provided on the front surface of the polarizer 40a. The outermost layer of the protective glass or the like constitutes a touch surface. The reflector 40c is disposed inside the active matrix substrate 10. Further, the backlight 40e is provided on the back surface of the polarizer 40b. The reflector 40c reflects light incident from the touch surface side. Further, the backlight 40e emits light onto the touch surface side. Further, as illustrated in FIG. 3, the reflector 40c includes a reflective region A1 and a transmissive region A2. For example, a recessed portion (or a hole portion) is formed at a central portion of the reflector 40c in a plan view, and light from the backlight 40e passes, in the Z direction, through the recessed portion (or the hole portion), which functions as the transmissive region A2. Then, by driving the liquid crystal layer 30, a state is switched between a state in which light reflected by the reflective region A1 or/and light transmitted through the transmissive region A2 is transmitted through the liquid crystal layer 30, and a state in which the light reflected by the reflective region A1 or/and the light transmitted through the transmissive region A2 is diffused. Note that FIG. 2A and FIG. 2B are cross-sectional views in the reflective region A1. Further, in FIG. 2A and FIG. 2B, an example is illustrated in which the reflector 40c is disposed inside the active matrix substrate 10, but the disclosure is not limited to this example, and the reflector 40c may be disposed between the active matrix substrate 10 and the polarizer 40b.

Then, a user visually recognizes an image from the front surface side of the polarizer 40a. Further, the touch panel 1 receives, on the touch surface, a touch operation by a finger or the like (a pointer), for example. For example, the touch panel 1 employs a transverse electric field drive method, as a method of driving liquid crystal molecules included in the liquid crystal layer 30. In order to realize the transverse electric field drive method, the pixel electrode 11 for forming an electric field and the touch sensor electrode 12 are formed in the active matrix substrate 10. Note that the "touch sensor electrode 12" is either a transmitter electrode 12a (hereinafter referred to as a "Tx electrode 12a") or a receiver electrode 12b (hereinafter referred to as an "Rx electrode 12b"), but when the Tx electrode 12a and the Rx electrode 12b are not distinguished from each other, they are each described as the "touch sensor electrode 12" in the present specification. The touch sensor electrode 12 functions as a common electrode disposed facing a plurality of the pixel electrodes 11. The touch sensor electrode 12 is provided commonly to the plurality of pixel electrodes 11. Further, as illustrated in FIG. 2A and FIG. 3, one or a plurality of slits 12c are provided at the touch sensor electrodes 12.

As illustrated in FIG. 2A, in the active matrix substrate 10, from the touch surface side, the touch sensor electrode 12, the touch signal line 13, a first insulating layer 14a, the pixel electrode 11, a second insulating layer 14b, the reflector 40c, a third insulating layer 14c, the gate line 15 (see FIG. 2B), a fourth insulating layer 14d, a semiconductor layer 16 (see FIG. 2B), a drain electrode 17 (see FIG. 2B) and a portion of a switching element 63, a fifth insulating layer 14e, a source line 18, and a glass substrate 10a are disposed in this order. Further, as illustrated in FIG. 3, in a plan view, the touch sensor electrode 12 is disposed so as to overlap with the pixel electrode 11. Further, as illustrated in FIG. 2A, in a plan view, the touch signal line 13 is disposed so as to overlap with the source line 18. Further, a width W1 of the touch signal line 13 is the same as the width of the source line 18. Further, the touch signal line 13 is formed so as to extend parallel to the source line 18. According to this configuration, compared to a case in which a plurality of the source lines 18 and a plurality of the touch signal lines 13 are disposed offset from each other in a plan view, dimensions of the touch panel 1 in a plan view can be reduced. Further, the plurality of touch signal lines 13 include a transmitter wiring line 13a connected to the transmitter electrode 12a and a receiver wiring line 13b connected to the receiver electrode 12b. Note that an arrangement position of each of the layers, and an arrangement order thereof in the thickness direction of the active matrix substrate 10 are not limited to this example.

Figure 4:
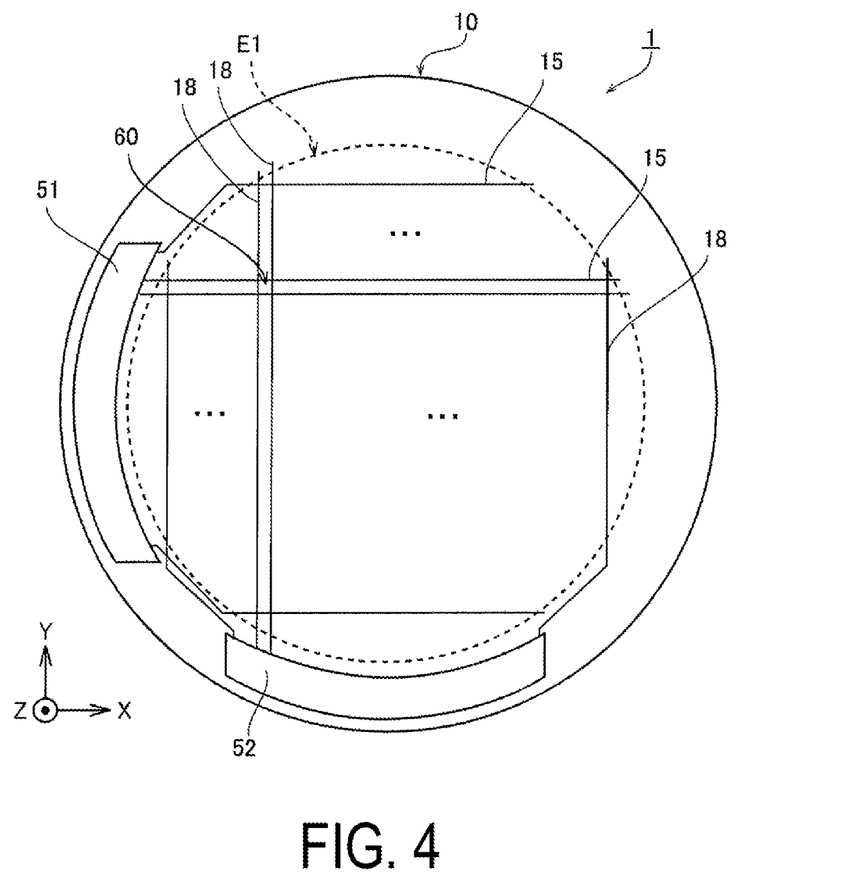
FIG. 4 is a schematic plan view of an active matrix substrate.

FIG. 4 is a schematic plan view for describing connections between a gate drive circuit 51 and a source drive circuit 52, and a thin film transistor 61. The active matrix substrate 10 is provided with the gate drive circuit 51 and the source drive circuit 52. In a plan view, a plurality of the gate lines 15 and a plurality of the source lines 18 intersect each other and are formed in a lattice pattern. Further, as illustrated in FIG. 4, the plurality of pixels 60, each of which is a region partitioned by the plurality of gate lines 15 and the plurality of source lines 18, are formed on the active matrix substrate 10. A region in which the plurality of pixels 60 are provided is referred to as a pixel region E1.

As illustrated in FIG. 4, in the first embodiment, the active matrix substrate 10 and the pixel region E1 each have a non-rectangular shape in a plan view, such as a circular shape, for example. Note that in the disclosure, the active matrix substrate 10 and the pixel region E1 are not limited to having the circular shape in a plan view, and may have a rectangular shape in a plan view, may have a polygonal shape in a plan view, or may have an elliptical shape in a plan view.

Figure 5:
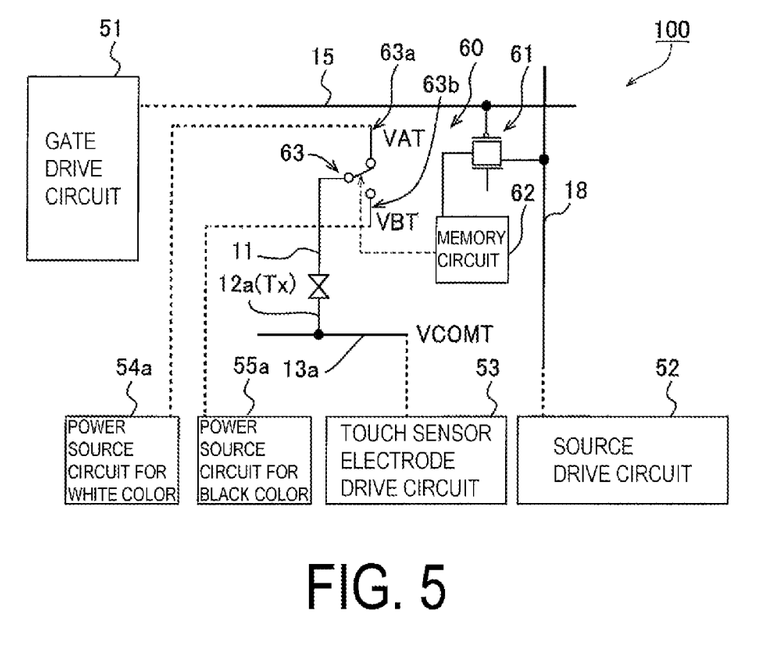
FIG. 5 is a diagram for describing a configuration of a pixel provided with the pixel electrode facing a Tx electrode.
Figure 6:
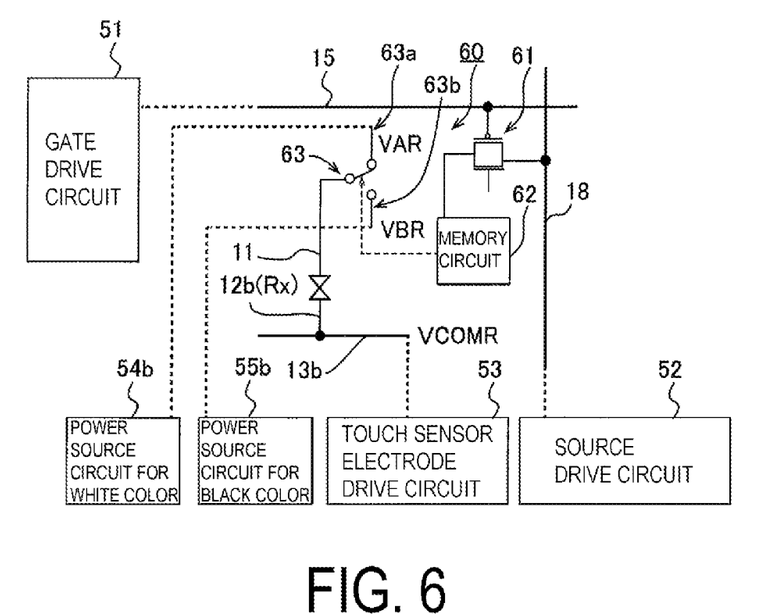
FIG. 6 is a diagram for describing a configuration of the pixel provided with the pixel electrode facing an Rx electrode.

FIG. 5 is a diagram for describing a configuration of the pixel 60 provided with the pixel electrode 11 facing the Tx electrode 12a. FIG. 6 is a diagram for describing a configuration of the pixel 60 provided with the pixel electrode 11 facing the Rx electrode 12b. As illustrated in FIG. 5 and FIG. 6, the pixel 60 is provided with the thin film transistor 61, the memory circuit 62, and the switching element 63. A gate electrode of the thin film transistor 61 is connected to the gate line 15, and a source electrode of the thin film transistor 61 is connected to the source line 18. Further, a drain electrode of the thin film transistor 61 is connected to the memory circuit 62. The memory circuitry 62 includes a one-bit SRAM (Static Random Access Memory), for example. In accordance with a command from the memory circuit 62, the switching element 63 switches between a state in which the pixel electrode 11 and a first wiring line 63a are connected to each other, and a state in which the pixel electrode 11 and a second wiring line 63b are connected to each other. The memory circuit 62 causes the switching element 63 to operate based on data written therein by the source drive circuit 52 via the thin film transistor 61 (data held by the memory circuit 62). As a result, a voltage is constantly supplied to the pixel electrode 11 via the first wiring line 63a or the second wiring line 63b.

Further, as illustrated in FIG. 5 and FIG. 6, the active matrix substrate 10 is provided with a touch sensor electrode drive circuit 53, power source circuits for white color 54a and 54b, and power source circuits for black color 55a and 55b. Each of the touch sensor electrode drive circuit 53, the power source circuits for white color 54a and 54b, and the power source circuits for black color 55a and 55b is constituted as a separate integrated circuit, for example. As illustrated in FIG. 5, the touch sensor electrode drive circuit 53 is connected to the Tx electrode 12a via the transmitter wiring line 13a. Further, as illustrated in FIG. 6, the touch sensor electrode drive circuit 53 is connected to the Rx electrode 12b via the receiver wiring line 13b. Note that at least two of the touch sensor electrode drive circuits 53, the power source circuits 54a and 54b for white color, and the power source circuits 55a and 55b for black color may be constituted by a common integrated circuit.

Figure 7:
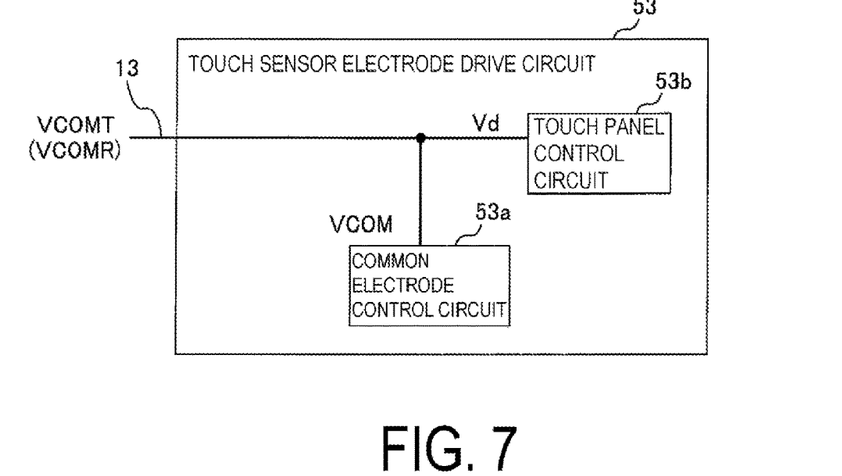
FIG. 7 is a block diagram of a touch sensor electrode drive circuit.
Figure 8:
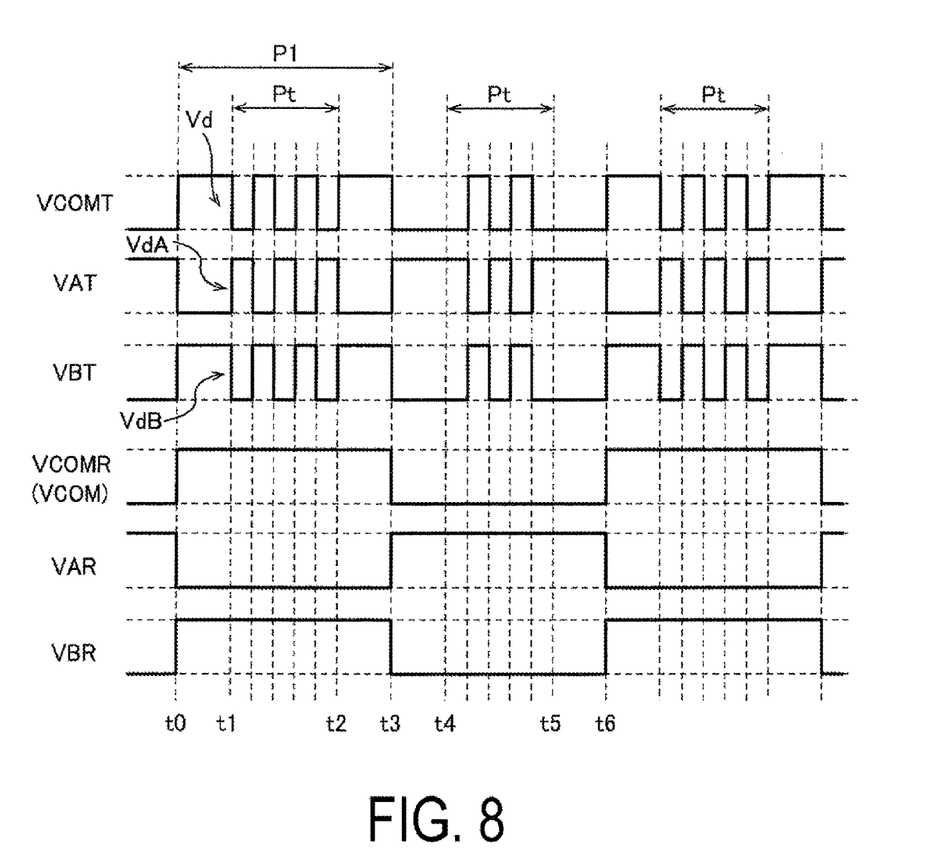
FIG. 8 is a timing chart for describing signals supplied to the pixel electrode and the touch sensor electrode.

FIG. 7 is a block diagram for describing a configuration of the touch sensor electrode drive circuit 53. FIG. 8 is a timing chart for describing a waveform of a voltage output from each of the touch sensor electrode drive circuit 53, the power source circuits for white color 54a and 54b, and the power source circuits for black color 55a and 55b. As illustrated in FIG. 7, the touch sensor electrode drive circuit 53 includes a common electrode control circuit 53a and a touch panel control circuit 53b. Each of the common electrode control circuit 53a and the touch panel control circuit 53b is constituted as an integrated circuit, for example.

Then, the common electrode control circuit 53a and the touch panel control circuit 53b are both connected to the touch signal line 13. Note that an example is illustrated above in which the common electrode control circuit 53a and the touch panel control circuit 53b are constituted as the separate integrated circuits, respectively, but they may be constituted as a single integrated circuit.

As illustrated in FIG. 8, the common electrode control circuit 53a outputs a voltage VCOM, which is a voltage for display. The voltage VCOM is a reference voltage with respect to the potential of the pixel electrode 11, and the liquid crystal layer 30 is driven by a potential difference between the potential of the pixel electrode 11 and the voltage VCOM. Further, the polarity of the voltage VCOM is inverted every time a predetermined period P1 elapses. In other words, the common electrode control circuit 53a drives the touch sensor electrode 12 (the common electrode) in an inverted manner. Specifically, the "voltage VCOM" is repeatedly and alternately caused to be in a High potential state and a Low potential state, every time the predetermined period P1 elapses.

Further, as illustrated in FIG. 8, the touch panel control circuit 53b supplies a drive signal Vd to the transmitter wiring line 13a to which the voltage VCOM is applied, during a touch sensor period Pt, which is a part of the predetermined period P1 (a period from a time point t1 to a time point t2 and a period from a time point t4 to a time point t5 in FIG. 8). Note that a voltage applied to the transmitter wiring line 13a is referred to as VCOMT. The "drive signal Vd" is, for example, a signal that inverts the polarity of the voltage VCOM a plurality of times during the touch sensor period Pt. Here, when a pulse voltage is additionally applied and superimposed on the voltage VCOM, the voltage becomes higher than a High voltage of the voltage VCOM, and this voltage may exceed a withstand voltage of an element to which the voltage is applied. In contrast to this, according to the configuration of the first embodiment, even when the drive signal Vd is superimposed on the voltage VCOM, the voltage VCOMT does not become a voltage higher than the High voltage of the voltage VCOM, and it is thus possible to prevent the voltage applied to the element from exceeding the withstand voltage of the element and thus damaging the element.

Further, in the first embodiment, as illustrated in FIG. 8, the touch panel control circuit 53b does not supply the drive signal Vd to the receiver wiring line 13b, but supplies a voltage VCOMR having the same phase as that of the voltage VCOM to the receiver wiring line 13b. Here, the "same phase" means that even when the voltage values are different from each other, a timing of switching from High to Low (a time point t3 in FIG. 8) is the same, and a timing of switching from Low to High (a time point t0 and a time point t6 in FIG. 8) is the same. Then, during the touch sensor period Pt, the touch panel control circuit 53b acquires a fluctuation of the voltage VCOMR as a mutual capacitance signal, and detects a touch by the pointer or the like based on the acquired mutual capacitance signal. In other words, when the pointer such as a finger is present between the Tx electrode 12a and the Rx electrode 12b, when the drive signal Vd supplied to the Tx electrode 12a is transmitted to the Rx electrode 12b, a mutual capacitance changes due to the pointer, and the voltage VCOMR fluctuates. The touch panel control circuit 53b detects the mutual capacitance signal by detecting the fluctuation of the voltage VCOMR.

Further, as illustrated in FIG. 5 and FIG. 6, the power source circuits for white color 54a and 54b are connected to the pixel electrodes 11 via the first wiring line 63a and the switching element 63, respectively. Further, the power source circuits for black color 55a and 55b are connected to the pixel electrodes 11 via the second wiring line 63b and the switching element 63, respectively.

Here, in the first embodiment, the power source circuit for white color 54a supplies a voltage VAT including a first signal VdA (see FIG. 8) having the opposite phase to that of the drive signal Vd, to the first wiring line 63a provided at the pixel 60 in which the Tx electrode 12a is disposed. Further, the power source circuit for black color 55a supplies a voltage VBT including a second signal VdB (see FIG. 8) having the same phase as that of the drive signal Vd, to the second wiring line 63b provided at the pixel 60 in which the Tx electrode 12a is disposed. Further, the power source circuit for white color 54b supplies a voltage VAR that is a voltage having the opposite phase to that of the voltage VCOMR supplied to the Rx electrode 12b, to the first wiring line 63a provided at the pixel 60 in which the Rx electrode 12b is disposed. The power source circuit for black color 55b supplies a voltage VBR that is a voltage having the same phase as that of the voltage VCOMR supplied to the Rx electrode 12b, to the second wiring line 63b provided at the pixel 60 in which the Rx electrode 12b is disposed. Here, the "opposite phase" means that even when the voltage values are different from each other, one of the voltages is switched from High to Low at a timing at which the other voltage is switched from Low to High, and one of the voltages is switched from Low to High at a timing at which the other voltage is switched from High to Low.

As a result, when the first wiring line 63a and the pixel electrode 11 are connected to each other by the switching element 63, a potential difference is generated between the pixel electrode 11 and the Tx electrode 12a or the Rx electrode 12b, and the liquid crystal layer 30 is driven to transmit light. Further, when the second wiring line 63b and the pixel electrode 11 are connected to each other by the switching element 63, a potential difference is not generated between the pixel electrode 11 and the Tx electrode 12a or the Rx electrode 12b. Thus, the liquid crystal layer 30 is not driven, and the light is diffused (or blocked). Then, according to the configuration described above, touch detection by a mutual capacitance method can be performed, and thus, the touch detection can be performed even when a voltage is applied to the pixel electrode 11 by the memory circuit 62. Further, even during a period in which the drive signal Vd is being supplied (the touch sensor period Pt), the potential difference between the pixel electrode 11 and the Tx electrode 12a can be kept constant, and thus, even during the touch sensor period Pt, the potential difference in the liquid crystal layer 30 does not change. As a result, it is possible to prevent the touch detection from affecting the display. As a result of these, the display device 100 provided with the memory-in-pixel and in-cell touch panel 1 can be provided without causing a display quality to deteriorate and the size of the pixel 60 to increase.

Figure 9:
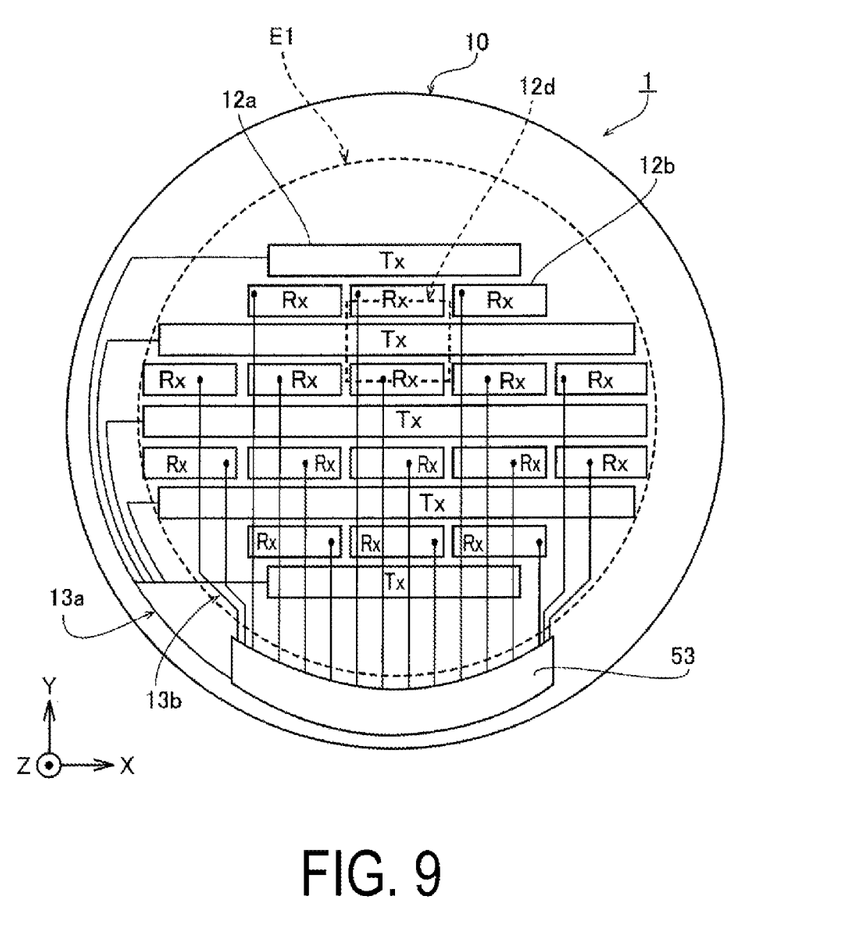
FIG. 9 is a schematic plan view for describing an arrangement relationship between the Tx electrode, the Rx electrode, and the touch sensor electrode drive circuit according to the first embodiment.

FIG. 9 is a diagram for describing an arrangement relationship between the Tx electrode 12a, the Rx electrode 12b, and the touch sensor electrode drive circuit 53 on the active matrix substrate 10. The Tx electrodes 12a and the Rx electrodes 12b are disposed alternately in the Y direction in a plan view. Each of a plurality of the Tx electrodes 12a has a rectangular shape in a plan view, for example, and is formed in a belt shape having long sides along the X direction. Further, a plurality of the Rx electrodes 12b are disposed side by side in the X direction. As a result, when the receiver wiring line 13b is formed so as to extend along the Y direction, a plurality of the receiver electrodes 12b can be easily connected to the receiver wiring line 13b. Then, a unit cell 12d is constituted by the Tx electrode 12a and two of the Rx electrodes 12b that are disposed so as to sandwich the Tx electrode 12a therebetween along the Y direction in a plan view. The unit cell 12d is a region that serves as a unit of coordinates at a time of the touch detection. Further, the touch sensor electrode drive circuit 53 is disposed in a portion (a frame portion) located further to the outer side than the pixel region E1. Note that, in FIG. 9, an example is illustrated in which five of the Tx electrodes 12a and 16 of the Rx electrodes 12b are provided, but the number and arrangement positions of the Tx electrodes 12a, and the number and arrangement positions of the Rx electrodes 12b are not limited to this example.

Further, as illustrated in FIG. 9, the common transmitter wiring line 13a is connected to the plurality of Tx electrodes 12a. According to this configuration, the transmitter wiring line 13a connected to the plurality of Tx electrodes 12a can be shared, and thus the configuration of the touch panel 1 can be simplified. Further, the voltage VCOMT is supplied to the plurality of Tx electrodes 12a at the same timing. The plurality of separate receiver wiring lines 13b are connected to the plurality of Rx electrodes 12b, respectively. The touch panel control circuit 53b supplies the common drive signal Vd to the plurality of Tx electrodes 12a, and acquires the mutual capacitance signal from the receiver wiring line 13b each connected to the plurality of Rx electrodes 12b. In this way, the touch panel control circuit 53b detects the touch by the pointer and identifies a touch position (coordinates). The touch panel control circuit 53b identifies the touch position by determining from which of the receiver wiring lines 13b, among the plurality of receiver wiring lines 13b, the mutual capacitance signal is acquired.

Second Embodiment

Next, a configuration of a display device with a touch panel 200 (hereinafter referred to as a "display device 200") according to a second embodiment will be described with reference to FIG. 10. Although a common transmitter wiring line 13a is provided with respect to the plurality of Tx electrodes 12a in the configuration of the first embodiment, in the second embodiment, transmitter wiring lines 213a are individually provided with respect to a plurality of Tx electrodes 212a. Note that when the same reference signs as in the first embodiment are used in the following description, they represent the same configurations as in the first embodiment, and reference is made to the preceding description unless otherwise described.

Configuration of Display Device According to Second Embodiment

Figure 10:
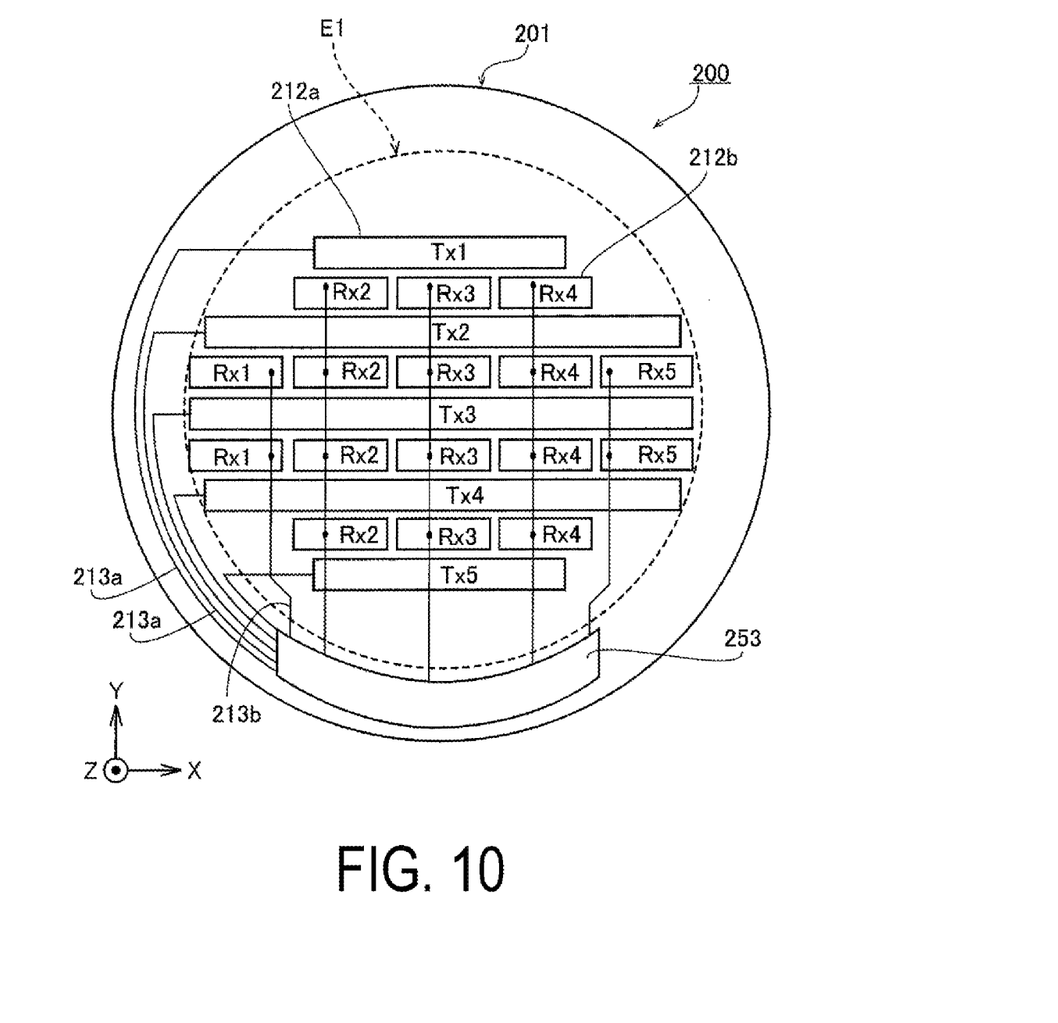
FIG. 10 is a schematic plan view for describing a configuration of a display device according to a second embodiment.

FIG. 10 is a schematic plan view of a touch panel 201 of the display device 200 according to the second embodiment. The plurality of Tx electrodes 212a and a plurality of Rx electrodes 212b are provided at the touch panel 201. Further, on the touch panel 201, the Tx electrodes 212a and the Rx electrodes 212b are alternately disposed in the Y direction in a plan view. Further, the touch panel 201 is provided with a touch sensor electrode drive circuit 253. Then, in the second embodiment, the transmitter wiring lines 213a are individually provided between each of the plurality of Tx electrodes 212a and the touch sensor electrode drive circuit 253. Further, among the plurality of Rx electrodes 212b, the Rx electrodes 212b having the same coordinate in the X direction are connected to a common receiver wiring line 213b. When the Rx electrodes 212b are denoted as Rx1, Rx2, Rx3, Rx4, and Rx5 along the X direction, a plurality of Rx1s are connected to the common receiver wiring line 213b. Similarly to Rx1s, Rx2s to Rx5s are also connected to the common receiver wiring lines 213b, respectively. The receiver wiring lines 213b are disposed so as to extend in the Y direction, for example.

Further, when the Tx electrodes 212a are denoted as Tx1, Tx2, Tx3, Tx4, and Tx5 along the Y direction, the touch sensor electrode drive circuit 253 supplies the drive signals Vd to Tx1 to Tx5, respectively, at separate timings. For example, the touch sensor electrode drive circuit 253 sequentially supplies the drive signals Vd to Tx1 to Tx5. Then, the touch sensor electrode drive circuit 253 identifies the touch position (coordinates) by identifying a timing at which the mutual capacitance signal is acquired from the Rx electrode 212b, and the receiver wiring line 213b from which the mutual capacitance signal is acquired. For example, when the mutual capacitance signal is acquired from the receiver wiring line 213b connected to Rx5s at a timing at which the touch sensor electrode drive circuit 253 supplies the drive signal Vd to Tx2, the touch position is a position in the vicinity of Tx2 in the Y direction and in vicinity of Rx5s in the X direction.

According to the above-described configuration of the second embodiment, the receiver wiring lines 213b connected to the plurality of Rx electrodes 212b can be shared, and thus the configuration of the touch panel 201 can be simplified. Further, in contrast to the configuration of the first embodiment in which the number of the touch signal lines 13 is 17, in the second embodiment, the number of the touch signal lines (the total number obtained by adding the number of receiver wiring lines 213b and the number of the transmitter wiring lines 213a) is 10. Thus, the number of the touch signal lines can be reduced. By reducing the number of touch signal lines, the number of terminals of the touch panel 201 is also reduced, and thus a flexible printed circuit board connected to the terminals can be downsized. Note that other configurations and effects of the second embodiment are the same as the configurations and effects of the first embodiment.

Third Embodiment

Next, a configuration of a display device with a touch panel 300 (hereinafter referred to as a "display device 300") according to a third embodiment will be described with reference to FIG. 11. In a touch sensor electrode drive circuit 353 of the display device 300 according to the third embodiment, an AC coupling circuit 356 that allows an AC component of a voltage to pass through is provided. Note that when the same reference signs as in the first or second embodiment are used in the following description, they represent the same configurations as in the first or second embodiment, and reference is made to the preceding description unless otherwise described.

Figure 11:
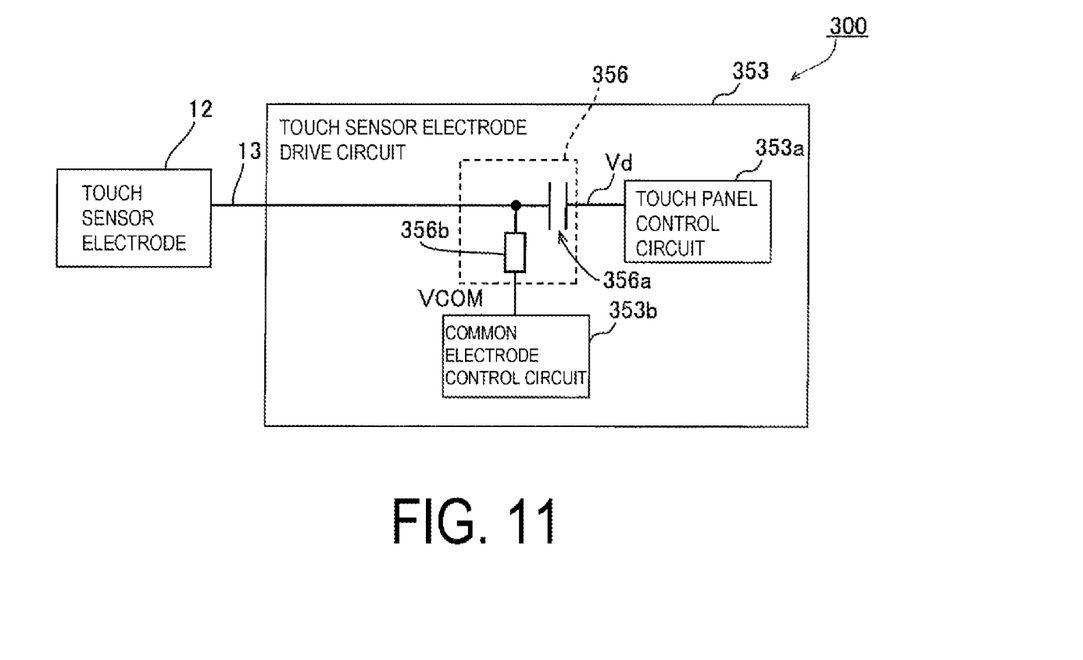
FIG. 11 is a block diagram of a display device (a touch sensor electrode drive circuit) according to a third embodiment.

FIG. 11 is a diagram for describing a configuration of the touch sensor electrode drive circuit 353 of the display device 300 according to the third embodiment. As illustrated in FIG. 11, the touch sensor electrode drive circuit 353 is connected to the touch sensor electrode 12 via the touch signal line 13. Then, the touch sensor electrode drive circuit 353 is provided with a touch panel control circuit 353a, a common electrode control circuit 353b, and the AC coupling circuit 356.

As illustrated in FIG. 11, the AC coupling circuit 356 is connected to the touch panel control circuit 353a and the common electrode control circuit 353b, and at the same time, is connected to the touch sensor electrode 12 via the touch signal line 13. Then, the AC coupling circuit 356 includes a capacitor 356a connected to the touch panel control circuit 353a, and a resistor 356b connected to the common electrode control circuit 353b. As a result, the AC coupling circuit 356 allows the AC component (the drive signal Vd and the mutual capacitance signal) to pass through between the touch sensor electrode 12 and the touch panel control circuit 353a, but a DC component from the touch sensor electrode 12 and the common electrode control circuit 353b is not applied to the touch panel control circuit 353a. According to this configuration, even when the magnitude of the voltage VCOM for display output from the common electrode control circuit 353b (DC component) is different from the magnitude of the voltage VCOMT supplied to the touch sensor electrode 12 from the touch panel control circuit 353a (DC component), it is possible to prevent a current from flowing between the common electrode control circuit 353b and the touch panel control circuit 353a. Then, the drive signal Vd transmitted as the AC component can be supplied to the touch sensor electrode 12 from the touch panel control circuit 353a. As a result, the touch panel control circuit 353a can be constituted using a general-purpose integrated circuit that outputs a magnitude of voltage that is different from the magnitude of the voltage VCOM output from the common electrode control circuit 353b. Compared with a case in which a dedicated integrated circuit is constituted to correspond to the magnitude of the voltage output from the common electrode control circuit 353b, the touch panel control circuit 353a can be constituted in an easier manner (costs can be reduced). Note that the other configurations and effects of the display device 300 according to the third embodiment are the same as the configurations and effects of the display device 100 according to the first embodiment.

Fourth Embodiment

Next, a configuration of a display device with a touch panel 400 (hereinafter referred to as a "display device 400") according to a fourth embodiment will be described with reference to FIG. 12 and FIG. 13. In a touch sensor electrode drive circuit 453 of the display device 400 according to the fourth embodiment, an AC coupling circuit 456 including a switching element 456b is provided. Note that when the same reference signs as in the first to third embodiments are used in the following description, they represent the same configurations as in the first to third embodiments, and reference is made to the preceding description unless otherwise described.

Figure 12:
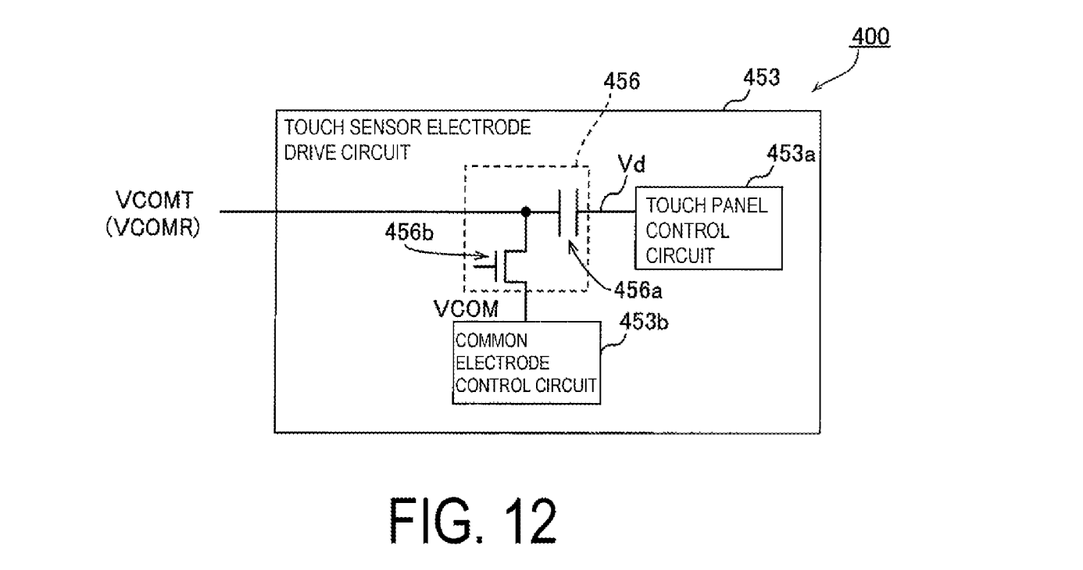
FIG. 12 is a block diagram of a display device (a touch sensor electrode drive circuit) according to a fourth embodiment.

FIG. 12 is a diagram for describing a configuration of the touch sensor electrode drive circuit 453 of the display device 400 according to the fourth embodiment. As illustrated in FIG. 12, the touch sensor electrode drive circuit 453 is connected to the touch sensor electrode 12 via the touch signal line 13. Then, the touch sensor electrode drive circuit 453 is provided with a touch panel control circuit 453a, a common electrode control circuit 453b, and the AC coupling circuit 456.

As illustrated in FIG. 12, the AC coupling circuit 456 is connected to the touch panel control circuit 453a and the common electrode control circuit 453b, and at the same time, is connected to the touch sensor electrode 12 via the touch signal line 13. Then, the AC coupling circuit 456 includes a capacitor 456a connected to the touch panel control circuit 453a, and the switching element 456b connected to the common electrode control circuit 453b.

Figure 13:
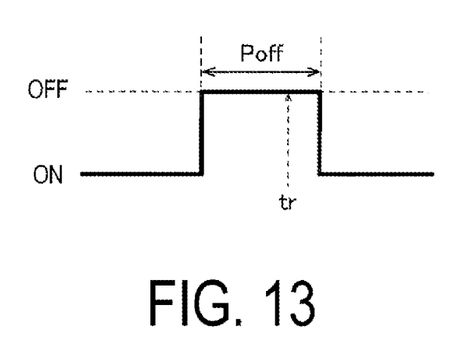
FIG. 13 is a timing chart for describing an operation of a switching element of the touch sensor electrode drive circuit.

FIG. 13 is a diagram for describing an operation timing of the switching element 456b. Based on a command of the touch panel control circuit 453a, the switching element 456b switches between a state (an ON state) in which the common electrode control circuit 453b and the touch sensor electrode 12 are conductive to each other, and a state (an OFF state) in which the common electrode control circuit 453b and the touch sensor electrode 12 are not conductive to each other. As illustrated in FIG. 13, the touch panel control circuit 453a acquires the mutual capacitance signal from the touch sensor electrode 12 at a time point tr during an Off period Poff during which the switching element 456b is turned off. According to this configuration, when receiving the mutual capacitance signal, the switching element 456b can cause the state in which the touch sensor electrode 12 and the common electrode control circuit 453b are not conductive to each other, and it is thus possible to prevent the current flowing from the common electrode control circuit 453b from affecting the mutual capacitance signal. As a result, accuracy of the touch detection can be improved while enabling the touch panel control circuit 453a to be constituted using the general-purpose integrated circuit. Note that the other configurations and effects of the display device 400 according to the fourth embodiment are the same as the configurations and effects of the display device 100 according to the first embodiment.

Modifications and the Like

The above-described embodiments are merely examples for carrying out the disclosure. Accordingly, the disclosure is not limited to the embodiments described above and can be implemented by modifying the embodiments described above as appropriate without departing from the scope of the disclosure.

(1) Although the Tx electrodes and the Rx electrodes are each formed in the rectangular shape in a plan view in the above-described first to fourth embodiments, the disclosure is not limited to this example. For example, the Tx electrodes and Rx electrodes may be each formed in a diamond shape, a polygonal shape, a circular shape, or an elliptical shape in a plan view.

(2) Although an example is illustrated, in the above-described first embodiment, in which the common transmitter wiring line is connected to the plurality of Tx electrodes, and an example is illustrated, in the above-described second embodiment, in which the common receiver wiring line is connected to the plurality of Rx electrodes, the disclosure is not limited to these examples. For example, the transmitter wiring lines may be individually connected to the plurality of Tx electrodes, respectively, while individually connecting the receiver wiring lines to the plurality of Rx electrodes, respectively.

The above-described display device with the touch panel can be described as follows.

A display device with a touch panel according to a first configuration includes a touch panel substrate including a plurality of pixels partitioned by a plurality of source lines and a plurality of gate lines, a plurality of pixel electrodes respectively provided at the plurality of pixels, a thin film transistor provided at each of the plurality of pixels and connected to one of the plurality of source lines and one of the plurality of gate lines, a memory circuit provided at each of the plurality of pixels and connected to the thin film transistor, a plurality of touch sensor electrodes disposed facing the plurality of pixel electrodes, a drive circuit configured to apply a voltage to the plurality of touch sensor electrodes, a first wiring line configured to supply, to each of the plurality of pixels, a voltage having an opposite phase to a phase of the voltage applied to the plurality of touch sensor electrodes, a second wiring line configured to supply, to each of the plurality of pixels, a voltage having the same phase as the phase of the voltage applied to the plurality of touch sensor electrodes, and a switching element configured to switch, based on data held by the memory circuit, between a state in which the pixel electrode and the first wiring line are connected to each other, and a state in which the pixel electrode and the second wiring line are connected to each other. The plurality of touch sensor electrodes include a plurality of transmitter electrodes to which a drive signal for touch detection is supplied from the drive circuit, and a plurality of receiver electrodes configured to supply, to the drive circuit, a mutual capacitance signal generated as a result of the drive signal being supplied to the plurality of transmitter electrodes. In the display device with the touch panel, a first power source circuit is further provided that is configured to supply a first signal having an opposite phase to a phase of the drive signal to the first wiring line provided at the pixel in which the pixel electrode is disposed facing one of the plurality of transmitter electrodes, and to supply a second signal having the same phase as the phase of the drive signal to the second wiring line provided at the pixel in which the pixel electrode is disposed facing one of the plurality of transmitter electrodes (the first configuration).

Here, it is conceivable to employ so-called self-capacitance touch detection configured to supply a drive signal to a touch sensor electrode, acquire a change in a self-capacitance of the touch sensor electrode, and detect a touch based on a change in the self-capacitance (charge amount). However, in a memory-in-pixel display device, a High potential voltage or a Low potential voltage is constantly applied to the pixel electrode by the memory circuit. Thus, a difference in the self-capacitance is generated between the touch sensor electrode facing the pixel electrode of the High voltage, and the touch sensor electrode facing the pixel electrode of the Low voltage. In this case, the touch cannot be detected based on the change in the self-capacitance (charge amount). In contrast, according to the above-described first configuration, since the touch detection by the mutual capacitance method can be performed, the touch detection can be performed even when the voltage is applied to the pixel electrode by the memory circuit. Accordingly, the touch detection can be performed even in the memory-in-pixel display device without providing the additional thin film transistor for bringing the pixel electrode into the floating state. As a result, the display device with the touch panel provided with the memory-in-pixel and in-cell touch panel can be provided. Further, by supplying the first signal having the opposite phase to the phase of the drive signal, to the first wiring line provided at the pixel in which the pixel electrode is disposed facing the transmitter electrode, and supplying the second signal having the same phase as the phase of the drive signal, to the second wiring line provided at the pixel in which the pixel electrode is disposed facing the transmitter electrode, a potential difference between the pixel electrode and the transmitter electrode can be made constant. As a result, the potential difference in the liquid crystal layer does not change, and it is thus possible to prevent the touch detection from affecting the display. As a result of these, the display device with the touch panel provided with the memory-in-pixel and in-cell touch panel can be provided without causing the display quality to deteriorate and the size of the pixel to increase.

In the first configuration, the display device with the touch panel may further include a second power source circuit constituted separately from the first power source circuit, the second power source circuit being configured to supply a voltage having the opposite phase to the phase of the voltage applied to the touch sensor electrode to the first wiring line provided at the pixel in which the pixel electrode is disposed facing one of the plurality of receiver electrodes, and to supply a voltage having the same phase as the phase of the voltage applied to the touch sensor electrode to the second wiring line provided at the pixel in which the pixel electrode is disposed facing one of the plurality of receiver electrodes (a second configuration).

According to the above-described second configuration, a voltage different from the voltage supplied to the pixel electrode disposed facing the transmitter electrode can be easily supplied to the pixel electrode disposed facing the receiver electrode using the second power source circuit different from the first power source circuit.

In the first or second configuration, a transmitter electrode and a receiver electrode of the plurality of transmitter electrodes and the plurality of receiver electrodes may be alternately disposed in a plan view, and the plurality of receiver electrodes may be disposed side by side in a direction orthogonal to a direction in which the transmitter electrode and the receiver electrode are alternately disposed. (a third configuration).

According to the above-described third configuration, when a transmitter wiring line connected to the plurality of transmitter electrodes or a receiver wiring line connected to the plurality of receiver electrodes is formed so as to extend along the direction in which the transmitter electrode and the receiver electrode are alternately disposed, the transmitter electrode and the transmitter wiring line can be easily connected to each other, or the receiver electrode and the receiver wiring line can be easily connected to each other.

In any one of the first to third configurations, a common transmitter wiring line may be connected to the plurality of transmitter electrodes, a plurality of receiver wiring lines may be individually connected to the plurality of receiver electrodes, respectively, and the drive circuit may supply a common drive signal to the plurality of transmitter electrodes via the transmitter wiring line, and receive the mutual capacitance signal from each of the plurality of receiver electrodes via each of the plurality of receiver wiring lines (a fourth configuration).

According to the above-described fourth configuration, the transmitter wiring line connected to the plurality of transmitter electrodes can be shared, and thus the configuration of the touch panel can be simplified.

In any one of the first to third configurations, a plurality of transmitter wiring lines may be individually connected to the plurality of transmitter electrodes, respectively, a common receiver wiring line may be connected to a plurality of receiver electrodes of the plurality of receiver electrodes, and the drive circuit may supply mutually separate drive signals to the plurality of transmitter electrodes, respectively, via the plurality of transmitter wiring lines, and receive the mutual capacitance signal from the plurality of receiver electrodes via the receiver wiring line (a fifth configuration).

According to the above-described fifth configuration, the receiver wiring line connected to the plurality of receiver electrodes can be shared, and thus the configuration of the touch panel can be simplified.

In any one of the first to fifth configurations, the drive circuit further may include a display control circuit configured to apply a voltage for display to the touch sensor electrode, a touch panel control circuit configured to supply a drive signal to the touch sensor electrode, and an AC coupling circuit connected to the touch sensor electrode and the touch panel control circuit and configured to allow an AC component of a voltage to pass through (a sixth configuration).

According to the above-described sixth configuration, even when the magnitude of the voltage for display output from the display control circuit (DC component) is different from the magnitude of a voltage supplied from the touch panel control circuit to the touch sensor electrode (DC component), the drive signal transmitted as the AC component can be supplied to the touch sensor electrode while preventing the current from flowing between the display control circuit and the touch panel control circuit. As a result, the touch panel control circuit can be constituted using a general-purpose integrated circuit that outputs a magnitude of voltage that is different from the magnitude of the voltage output from the display control circuit. Compared with the case in which the dedicated integrated circuit is constituted to correspond to the magnitude of the voltage output from the display control circuit, the touch panel control circuit can be constituted in an easier manner.

In the sixth configuration, the drive circuit further may further include a switching element connected to the touch sensor electrode and the display control circuit and configured to switch between a state in which the touch sensor electrode and the display control circuit are conductive to each other, and a state in which the touch sensor electrode and the display control circuit are not conductive to each other, and when receiving the mutual capacitance signal from at least one of the plurality of receiver electrodes, the drive circuit may be configured to switch the state in which the touch sensor electrode and the display control circuit are conductive to each other to the state in which the touch sensor electrode and the display control circuit are not conductive to each other by the switching element (a seventh configuration).

According to the above-described seventh configuration, when receiving the mutual capacitance signal, since a state can be obtained by the switching element in which the touch sensor electrode and the display control circuit are not conductive to each other, it is possible to prevent the current flowing from the display control circuit from affecting the mutual capacitance signal. As a result, the accuracy of the touch detection can be improved while allowing the touch panel control circuit to be constituted using the general-purpose integrated circuit.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A display device with a touch panel, the display device comprising:
    a touch panel substrate including a plurality of pixels partitioned by a plurality of source lines and a plurality of gate lines;
    a plurality of pixel electrodes respectively provided at the plurality of pixels;
    a thin film transistor provided at each of the plurality of pixels and connected to one of the plurality of source lines and one of the plurality of gate lines;
    a memory circuit provided at each of the plurality of pixels and connected to the thin film transistor;
    a plurality of touch sensor electrodes disposed facing the plurality of pixel electrodes;
    a drive circuit configured to apply a voltage to the plurality of touch sensor electrodes;
    a first wiring line configured to supply, to each of the plurality of pixels, a voltage having an opposite phase to a phase of the voltage applied to the plurality of touch sensor electrodes;
    a second wiring line configured to supply, to each of the plurality of pixels, a voltage having the same phase as the phase of the voltage applied to the plurality of touch sensor electrodes; and
    a switching element configured to switch, based on data held by the memory circuit, between a state in which the pixel electrode and the first wiring line are connected to each other, and a state in which the pixel electrode and the second wiring line are connected to each other,
    wherein the plurality of touch sensor electrodes include a plurality of transmitter electrodes to which a drive signal for touch detection is supplied from the drive circuit, and a plurality of receiver electrodes configured to supply, to the drive circuit, a mutual capacitance signal generated as a result of the drive signal being supplied to the plurality of transmitter electrodes, and
    a first power source circuit is further provided that is configured to supply a first signal having an opposite phase to a phase of the drive signal to the first wiring line provided at the pixel in which the pixel electrode is disposed facing one of the plurality of transmitter electrodes, and to supply a second signal having the same phase as the phase of the drive signal to the second wiring line provided at the pixel in which the pixel electrode is disposed facing one of the plurality of transmitter electrodes.

2. The display device with the touch panel according to claim 1, further comprising:
    a second power source circuit constituted separately from the first power source circuit, the second power source circuit being configured to supply a voltage having the opposite phase to the phase of the voltage applied to the touch sensor electrode to the first wiring line provided at the pixel in which the pixel electrode is disposed facing one of the plurality of receiver electrodes, and to supply a voltage having the same phase as the phase of the voltage applied to the touch sensor electrode to the second wiring line provided at the pixel in which the pixel electrode is disposed facing one of the plurality of receiver electrodes.

3. The display device with the touch panel according to claim 1,
    wherein a transmitter electrode and a receiver electrode of the plurality of transmitter electrodes and the plurality of receiver electrodes are alternately disposed in a plan view, and the plurality of receiver electrodes are disposed side by side in a direction orthogonal to a direction in which the transmitter electrode and the receiver electrode are alternately disposed.

4. The display device with the touch panel according to claim 1,
    wherein a common transmitter wiring line is connected to the plurality of transmitter electrodes,
    a plurality of receiver wiring lines are individually connected to the plurality of receiver electrodes, respectively, and
    the drive circuit supplies a common drive signal to the plurality of transmitter electrodes via the transmitter wiring line, and receives the mutual capacitance signal from each of the plurality of receiver electrodes via each of the plurality of receiver wiring lines.

5. The display device with the touch panel according to claim 1,
wherein a plurality of transmitter wiring lines are individually connected to the plurality of transmitter electrodes, respectively,
a common receiver wiring line is connected to a plurality of receiver electrodes of the plurality of receiver electrodes, and
the drive circuit supplies mutually separate drive signals to the plurality of transmitter electrodes, respectively, via the plurality of transmitter wiring lines, and receives the mutual capacitance signal from the plurality of receiver electrodes via the receiver wiring line.

6. The display device with the touch panel according to claim 1,
wherein the drive circuit further includes
a display control circuit configured to apply a voltage for display to the touch sensor electrode,
a touch panel control circuit configured to supply a drive signal to the touch sensor electrode, and
an AC coupling circuit connected to the touch sensor electrode and the touch panel control circuit and configured to allow an AC component of a voltage to pass through.

7. The display device with the touch panel according to claim 6,
wherein the drive circuit further includes a switching element connected to the touch sensor electrode and the display control circuit and configured to switch between a state in which the touch sensor electrode and the display control circuit are conductive to each other, and a state in which the touch sensor electrode and the display control circuit are not conductive to each other, and
when receiving the mutual capacitance signal from at least one of the plurality of receiver electrodes, the drive circuit switches the state in which the touch sensor electrode and the display control circuit are conductive to each other to the state in which the touch sensor electrode and the display control circuit are not conductive to each other by the switching element.

\* \* \* \* \*